H. B. ROGERS.
LIFE SAVING BELT.
APPLICATION FILED DEC. 16, 1916.
1,236,365.
Patented Aug. 7, 1917.
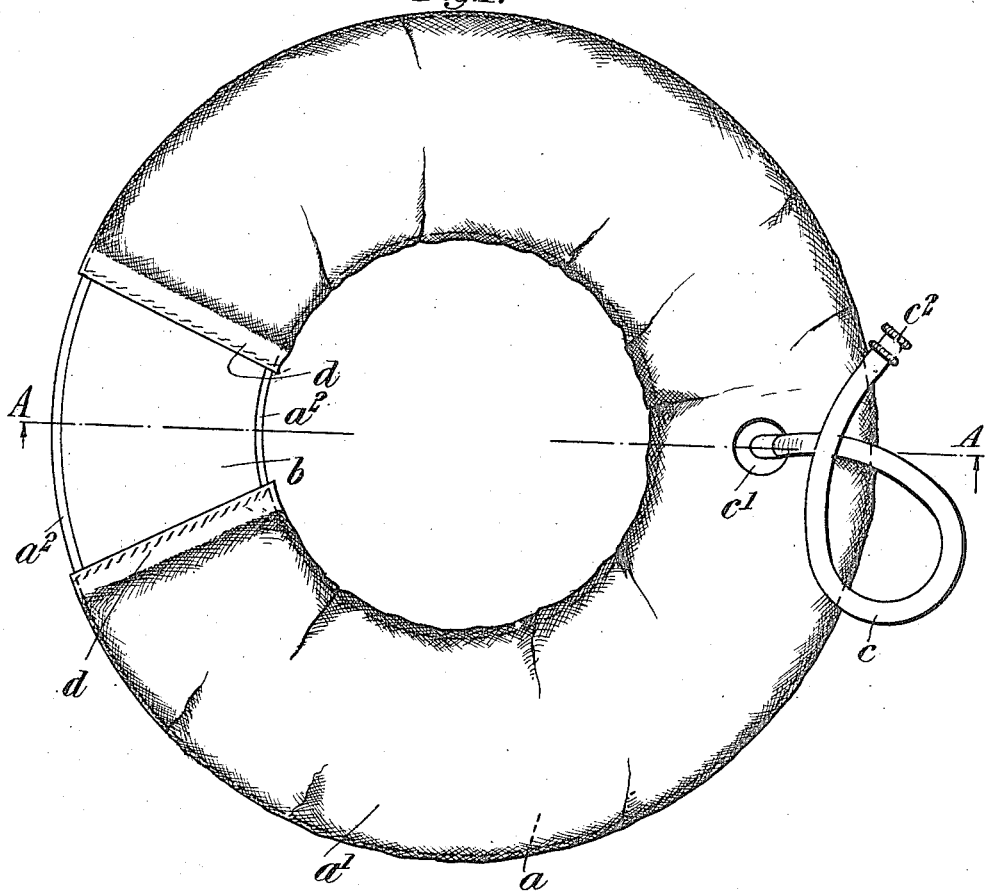
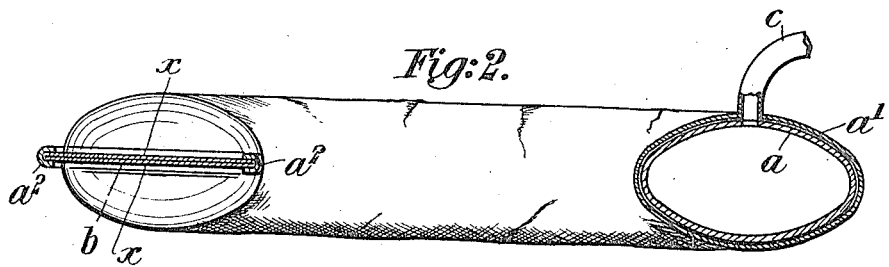
Inventor:
Harry Botwright Rogers.
by
his Attorney.

UNITED STATES PATENT OFFICE.

HARRY BOTWRIGHT ROGERS, OF LONDON, ENGLAND.

LIFE-SAVING BELT.

1,236,365.             Specification of Letters Patent.      Patented Aug. 7, 1917.

Application filed December 16, 1916. Serial No. 137,428.

*To all whom it may concern:*

Be it known that I, HARRY BOTWRIGHT ROGERS, a subject of the King of England, of London, England, have invented certain new and useful Improvements in Life-Saving Belts, of which the following is a specification.

This invention relates to an appliance in the nature of a buoyant belt for saving life from drowning and is intended for use by persons traveling on the water, or otherwise running the risk of immersion.

Broadly stated the invention comprises a continuous elastic belt of india rubber or other material impervious to water, said belt consisting as to approximately one tenth of its circumference of a flat or band part and as to the remainder of a hollow or tubular part or chamber adapted to be inflated.

In the accompanying drawings Figure 1 is a plan view of a belt made in accordance with my invention and shown as inflated and Fig. 2 is a section on the line A—A of Fig. 1.

The improved life saving belt consists of an elastic inflatable pneumatic belt made of india rubber or other suitable material impervious to water and but for the flat or band part hereinafter described is in the form of a continuous tube or chamber encircling the body of the wearer. Part of the belt constituting about one tenth of its circumference (hereinafter called the band part $b$) consists of a flat band of india rubber or other suitable material. The remaining part $a$ that is to say about nine-tenths of the belt which is tubular (hereinafter called the inflation part) is inclosed in a strong covering $a^1$ made of any suitable fabric, for example aeroplane cloth or strong cotton silesia, which limits the extent of inflation. At the ends of the inflation part of the tube and slightly overlapping the band part the covering is caused to adhere to the tube as at $d$ and to the center of the inflation part $a$ of the tube a flexible pipe $c$ of rubber or other suitable material is connected (passing through a hole $c^1$ in the covering made for the purpose) said pipe being of about one foot in length and by which the wearer can with his mouth inflate the inflation part $a$ of the belt while in position on his person, such pipe being furnished with a mouth piece $c^2$ which may contain an air valve, preferably a valve which normally is a one-way valve, that is to say a valve which will normally allow air to pass into the inflation part $a$ but which can be opened to allow air to be exhausted from said part.

A convenient and cheap way of making the belt is as follows:—I take two disks $x$ of sheet rubber or other suitable material about twenty inches in diameter with a hole in the center about ten inches in diameter. The two disks are then laid one on the other. For about one tenth in circumference the contiguous sides of said disks are treated with a vulcanizing solution, a mixture being adapted according to the kind of rubber which is used whereby the disks are caused to adhere to make the band part $b$. The hole $c^1$ is made in one of the two disks for passage of the inflation pipe $c$ which is connected in any well known manner. The two disks are connected along the outer and inner circumferences by an overlapping rubber tape $a^2$ attached by means of an adhesive vulcanizing solution in the usual way, thus forming a flat circular tube about five inches in width with one tenth of its circumferential length consolidated at the part $b$. The tube is then vulcanized, after which the inflation part $a$ is covered with the fabric covering $a^1$ which is suitably shaped and is sewn on, the ends of said covering being made to adhere to the rubber at $d$ by means of adhesive solution. The inflation pipe $c$ is provided with an air valve as aforesaid which is fixed before the vulcanization.

The flat or band part $b$ should be at the back of the wearer, and attains two objects, that is to say it insures sufficient elasticity to enable the appliance to fit persons of any size even when inflated and it secures the proper pose of the wearer in the water with his face upward.

The belt can if desired be constantly worn ready for use either outside the clothing or inside same. It can be rapidly put on by being passed over the head or the legs to about the center of the body. It is free from all fastenings and contains no parts likely to get out of order.

What I claim as my invention and desire to secure by Letters Patent of the United States is:—

1. A life saving device comprising a continuous belt of material impervious to water, said belt consisting as to a minor portion of its circumference of a single flat elastic portion enabling the belt to resiliently fit the wearer and when properly positioned insuring position of the wearer face upward when in the water, and consisting as to the remainder of said circumference of a hollow inflatable portion.

2. A life-saving device comprising a continuous belt of material impervious to water, said belt consisting as to approximately one tenth of its circumference of a single flat elastic portion enabling the belt to resiliently fit the wearer and when properly positioned insuring position of the wearer face upward when in the water, and consisting as to the remainder of said circumference of a tubular part or chamber, and means carried by said latter part for inflating and deflating same.

3. A life saving device comprising a continuous belt formed of two annular members of material impervious to water attached together over their whole surface for approximately one tenth of their circumference to form a flat or band portion and for the remainder of the circumference attached together at their edges only to form a tubular chamber.

4. A life saving device comprising a continuous belt formed of two annular members of material impervious to water attached together over their whole surface for approximately one tenth of their circumference to form a flat or band portion and for the remainder of the circumference attached together at their edges only to form a tubular chamber and an outer covering of textile material for said belt.

5. A life saving device comprising a continuous belt formed of two annular members of material impervious to water attached together over their whole surface for approximately one tenth of their circumference to form a flat or band portion and for the remainder of the circumference attached together at their edges only to form a tubular chamber, an outer covering of textile material for said belt and inflating means for said tubular chamber extending through said covering.

In witness whereof I have signed this specification in the presence of two witnesses.

HARRY BOTWRIGHT ROGERS.

Witnesses:
A. W. CLAREMONT,
MAURICE G. ROGERS.

Copies of this patent may be obtained for five cents each, by addressing the "Commissioner of Patents, Washington, D. C."